United States Patent [19]
Hirata

[11] Patent Number: 6,027,044
[45] Date of Patent: Feb. 22, 2000

[54] CONSTANT FLOWRATE WATER SAVING VALVE AND SHOWER HEAD USING THE SAME

[76] Inventor: Masahiro Hirata, 13, Sennyuji Goyonotsuji-cho, Higashiyama-ku, Kyoto-shi, Kyoto 605, Japan

[21] Appl. No.: 09/051,617
[22] PCT Filed: Jul. 31, 1997
[86] PCT No.: PCT/JP97/02693
§ 371 Date: Apr. 15, 1998
§ 102(e) Date: Apr. 15, 1998
[87] PCT Pub. No.: WO98/08013
PCT Pub. Date: Feb. 26, 1998

[30] Foreign Application Priority Data

Aug. 19, 1996 [JP] Japan .................................. 8-238462

[51] Int. Cl.[7] .................................................. E03C 1/08
[52] U.S. Cl. .................... 239/428.5; 239/381; 239/457; 239/530; 239/562; 239/570; 137/888; 137/895
[58] Field of Search ........................... 239/548, 554, 239/570, 571, 530, 587.3, 587.4, 562, 588, 380, 381, 407, 419.5, 428.5, 589, 600, 456, 457, 541; 137/888, 895

[56] References Cited

U.S. PATENT DOCUMENTS

| | | | |
|---|---|---|---|
| 3,672,574 | 6/1972 | Knapp | 239/428.5 |
| 4,202,501 | 5/1980 | Haynes | 239/570 |
| 4,275,843 | 6/1981 | Moen | 239/570 X |
| 4,523,718 | 6/1985 | Pearson | 239/428.5 X |
| 5,361,804 | 11/1994 | Keller et al. | 239/428.5 X |
| 5,826,799 | 10/1998 | Hsieh | 239/428.5 |

FOREIGN PATENT DOCUMENTS

| | | |
|---|---|---|
| 8-144339 | 6/1996 | Japan . |
| 8-177095 | 7/1996 | Japan . |

OTHER PUBLICATIONS

European Search Report in Application EP 97–93–3886, corresponding to U.S. application Ser. No. 09/051,617.

*Primary Examiner*—Andres Kashnikow
*Assistant Examiner*—Steven J. Ganey
*Attorney, Agent, or Firm*—Morgan & Finnegan, L.L.P.

[57] ABSTRACT

A constant flowrate water saving valve comprises a main valve body having a peripheral wall formed with a conical-shaped valve seat surface, a liquid inlet opening on a side of the inner diameter $r_1$, a vent flow opening on a side of the inner diameter $r_2$ and a plurality of liquid radiant outflow openings extending, while intersecting in an axial direction, and a movable valve member received in the main valve body to be movable in the axial direction, the valve being such that when the movable valve member is fully seated on the conical-shaped valve seat surface in the main valve body, a liquid inlet opening side portion of the main valve body communicates with an outside through respective upper edge side opening portions of the plurality of liquid radiant outflow openings and a vent flow opening side portion of the main valve body communicates with an outside through respective lower edge side opening portions of the plurality of liquid radiant outflow openings, and a shower head uses the constant flowrate water saving valve.

4 Claims, 5 Drawing Sheets

CONSTANT FLOWRATE WATER SAVING VALVE AND SHOWER HEAD USING THE SAME

TECHNICAL FIELD

This invention relates to improvements in a constant flowrate water saving valve used by being attached to the outlet of a channel including a flow rate adjusting cock, such as a tap, and to a shower head having said constant flowrate water saving valve housed therein. Particularly, it relates to a constant flowrate water saving valve and to a shower head having the constant flowrate water saving valve housed therein, wherein the flow rate of fluid to be discharged is pre-adjusted to a particular value in the engineering design stage to make it possible to save water according to the surroundings in which it is used, and wherein air is sucked and mixed in the fluid during the discharge of the latter, the mixed fluid being discharged through the shower while retaining the momentum of its flow.

BACKGROUND ART

As is known in the art, the city water system comprises water taps attached to individual terminal channels to allow a controlled amount of water to be discharged through the spout by turning on said tap. Users of such city water system often tend to turn on taps to a large extent to discharge a large wasteful amount of water even when they actually use a small amount of water. With the object of preventing wasteful discharge in connection with the utilization of such city water system, there have heretofore been developed water saving valves intended to limit the amount of discharge water by utilizing the fluid pressure as the flow rate increases due to the increasing degree of the opening of the tap.

As an example of conventional water saving valve, there is known a water saving valve for use in flow rate adjusting cocks developed by the same applicant and disclosed in Japanese Laid-Open Utility Model Publication No. 41,283 of 1991. This water saving valve for use in flow rate adjusting cocks disclosed in Japanese Laid-open Utility Model Publication No. 41,283 of 1991 is designed such that when the tap has been closed, the spherical valve body is abutting against a stop member under the action of the valve body urging means to shut the fluid channel, and when the tap is gradually turned on until the flow rate on the inlet side is $W_1$, the spherical valve body is axially moved against the urging force of valve body urging means until it reaches an intermediate position which lies away from the stop member and which maintains a channel between the stop member and a conical shaped valve seat surface, allowing the fluid to be discharged at the flow rate $w_1$ from a fluid outlet opening through the channel between the stop member and the conical-shaped valve seat surface, and on the other hand when the flow rate on the inlet side increases to $W_2$, the resulting fluid pressure forces said spherical valve body to abut against the conical-shaped valve seat surface against the urging force of the valve body urging means and thereby close the fluid outlet opening, thus shutting off the discharge of the fluid. That is, according to the one disclosed in Japanese Laid-Open Utility Model Publication No. 41,283 of 1991, it is arranged that the outflow of the fluid is shut off at the stage when the flow rate on the inlet side reaches $W_2$; in this point the arrangement has an inconvenient side to it.

As for another example of a conventional water saving valve, there is known a flow rate adjusting water saving valve developed by the same applicant and disclosed in Japanese Laid-Open utility Model Publication No. 19,743 of 1993. This flow rate adjusting water saving valve disclosed in Japanese Laid-Open Utility Model Publication No. 19,743 of 1993 is designed such that when the tap has been closed, the spherical valve body is abutting against a stop member under the action of the urging means to shut, the fluid channel, and when the tap is gradually turned on until the flow rate on the inlet side is $W_1$, the spherical valve body is axially moved against the urging force of valve body urging means until it reaches an intermediate position which lies away from the stop member and which maintains a channel between the stop member and a conical-shaped valve seat surface, allowing the fluid to be discharged at the flow rate $w_1$ from a fluid outlet opening and from a fluid radial outflow opening through the channel between the stop member and the conical-shaped valve seat surface, and on the other hand when the flow rate on the inlet side increases to $W_2$, the resulting fluid pressure forces said spherical valve body to abut against the conical shaped valve seat surface against the urging force of the valve body urging means and thereby close the fluid outlet opening, but allowing the fluid to be discharged from the fluid radial outflow opening. This example of conventional water saving valve has not been adapted to fully function in the matter of the regularity of flow of the fluid. Further, this arrangement requires a valve body urging means comprising a coil spring or the like, thus having the problems that the number of parts is large and that the construction is complicated.

Further, a conventional water saving valve has been provided which is designed such that the fluid outlet opening is simply reduced in diameter (for example, a small hole of about I mm in diameter) as compared with the fluid inlet opening in the main valve body, in order to increase the flow rate by reducing the amount of water simply to achieve the saving of water. This conventional water saving valve having such fluid outlet opening of small diameter has the serious problem of the fluid outlet opening being choked, requiring regular cleaning in order to secure the passage through the fluid outlet opening.

Accordingly, this invention relates to improvements in a constant flowrate water saving valve effectively applied in a fluid channel containing a flow rate adjusting cock, such as a tap, particularly extremely effectively applied to a fluid discharge part, such as a shower head, the arrangement being such that a suitable amount of water is discharged in a state of regular flow which gives a feeling of affluent flow under water saving conditions even when the tap is operated in the direction of maximum degree of opening and such that the fluid is discharged through the shower in a state in which air is sucked and mixed therein during the discharge of the fluid.

DISCLOSURE OF THE INVENTION

In achieving said object, the invention provide a constant flowrate water saving valve comprises a main valve body basically in the form of a cylindrical body having a peripheral wall, a first inner diameter portion of inner diameter $r_1$ on one axial end side, a second inner diameter portion of inner diameter $r_2$ ($r_1 > r_2$), a conical-shaped valve seat surface connecting said first and second inner diameter portions, a fluid inlet opening on the side associated with said first inner diameter portion, a ventilation opening of diameter $r_b$ on the side associated with said second inner diameter portion, and a plurality of fluid radial outflow openings of diameter $r_a$ extending through the peripheral wall to cross the axis, and a movable valve member axially movably received in said main valve body.

In this invention, the constant flowrate water saving valve is arranged such that when said movable valve member comes into perfect valve seat abutment against said conical-shaped valve seat surface, the fluid inlet opening in said main valve body communicates with the outside through the upper edge-side opening portions of said plurality of fluid radial outflow openings and the ventilation opening in said main valve body communicates with the outside through the lower edge-side opening portions of said plurality of fluid radial outflow openings.

Further, the constant flowrate water saving valve of this invention is arranged such that when fluid is passed through the main valve body, air is sucked in through the lower edge-side opening portions of said fluid radial outflow openings to be mixed in the fluid being discharged.

Further, in the constant flowrate water saving valve of this invention, said movable valve member is composed of a sphere of outer diameter R ($r_1 > R > r_2$, $R > r_a$) or a modified sphere provided with a guide member and having a diameter $R_0$ ($r_1 > R_0 > r_2$) extending along an axis which is directed by said guide member and orthogonal to the central axis.

The invention also provides an arrangement comprising a shower head main body having a valve receiving portion,
  a constant flowrate water saving valve attached to the valve receiving portion of said shower head main body and having at least one fluid radial outflow opening,
  a shower head discharge port attachment having a peripheral wall by which the fluid discharged from the fluid radial outflow opening in said constant flowrate water saving valve is limited to the direction of the outflow axis,
  said constant flowrate water saving valve comprising a main valve body basically in the form of a cylindrical body having a peripheral wall, a first inner diameter portion of inner diameter $r_1$ on one axial end side, a second inner diameter portion of inner diameter $r_2$ ($r_1 > r_2$), a conical-shaped valve seat surface connecting said first and second inner diameter portions, a fluid inlet opening on the side associated with said first inner diameter portion, a ventilation opening of diameter $r_b$ on the side associated with said second inner diameter portion, and a plurality of fluid radial outflow openings of diameter $r_a$ extending through the peripheral wall to cross the axis, and
  a movable valve member axially movably received in said main valve body,
  said constant flowrate water saving valve being arranged such that when said movable valve member comes into perfect valve seat abutment against said conical-shaped valve seat surface, the side of said main valve body associated with the fluid inlet opening communicates with the outside through the upper edge-side opening portions of said plurality of fluid radial outflow openings and the side of said main valve body associated with the ventilation opening communicates with the outside through the lower edge-side opening portions of said plurality of fluid radial outflow openings.

The constant flowrate water saving valve according to the invention arranged in the manner described above operates as follows. The constant flowrate water saving valve is installed in the fluid discharge terminal of the fluid channel, and when the flow rate adjusting cock is operated at its maximum degree of opening, the fluid from the fluid inlet opening in the main valve body is discharged in a water saving manner from fluid radial outflow openings having a small area of opening as compared with the fluid inlet opening in the main valve body.

When the spherical valve body comes into perfect valve seat abutment against the conical-shaped valve seat surface within the main valve body, the side of said main valve body associated with the fluid inlet opening communicates with the outside through the upper edge-side opening portions of said plurality of fluid radial outflow openings and the side of said main valve body associated with the ventilation opening communicates with the outside through the lower edge-side opening portions of said plurality of fluid radial outflow openings, whereby the fluid from the fluid inlet opening in the main valve body is radially discharged into the outside through the upper edge-side opening portions of the plurality of fluid radial outflow openings. On the other hand, when the fluid is passed through the main valve body, external air is sucked in through the lower edge-side opening portions of the plurality of fluid radial outflow openings and gas-liquid mixed fluid is discharged through the ventilation opening in the main valve body.

BRIEF DESCRIPTION OF THE DRAWINGS

FIG. 1A is a schematic side view, in section, showing a first embodiment thereof; FIG. 1B is a schematic side view, in section, showing a second embodiment thereof; and FIG. 1C is a schematic side view, in section, showing a third embodiment thereof.

FIG. 2A is a schematic side view, in section, for explaining experimental data obtained when a ventilation opening 7 in a main valve body 2 is opened; and FIG. 2B is a schematic side view, in section, for explaining experimental data obtained when the ventilation opening 7 in the main valve body 2 is closed.

FIG. 3A is a schematic side view, in section, showing various components in their separated state; and FIG. 3B is a schematic side view, in section, showing said components in their assembled state.

FIG. 4A is a schematic front view thereof; and FIG. 4B is a schematic side view.

FIG. 5A is a schematic side view thereof, partly broken away, showing how it is installed; and FIG. 5B is a schematic sectional side view, with its main portion shown in section.

BEST MODE FOR EMBODYING THE INVENTION

A constant flowrate water saving valve and a shower head using said constant flowrate water saving valve according to the invention will now be described in detail with reference to the accompanying drawings showing concrete embodiments thereof.

Figure 1:
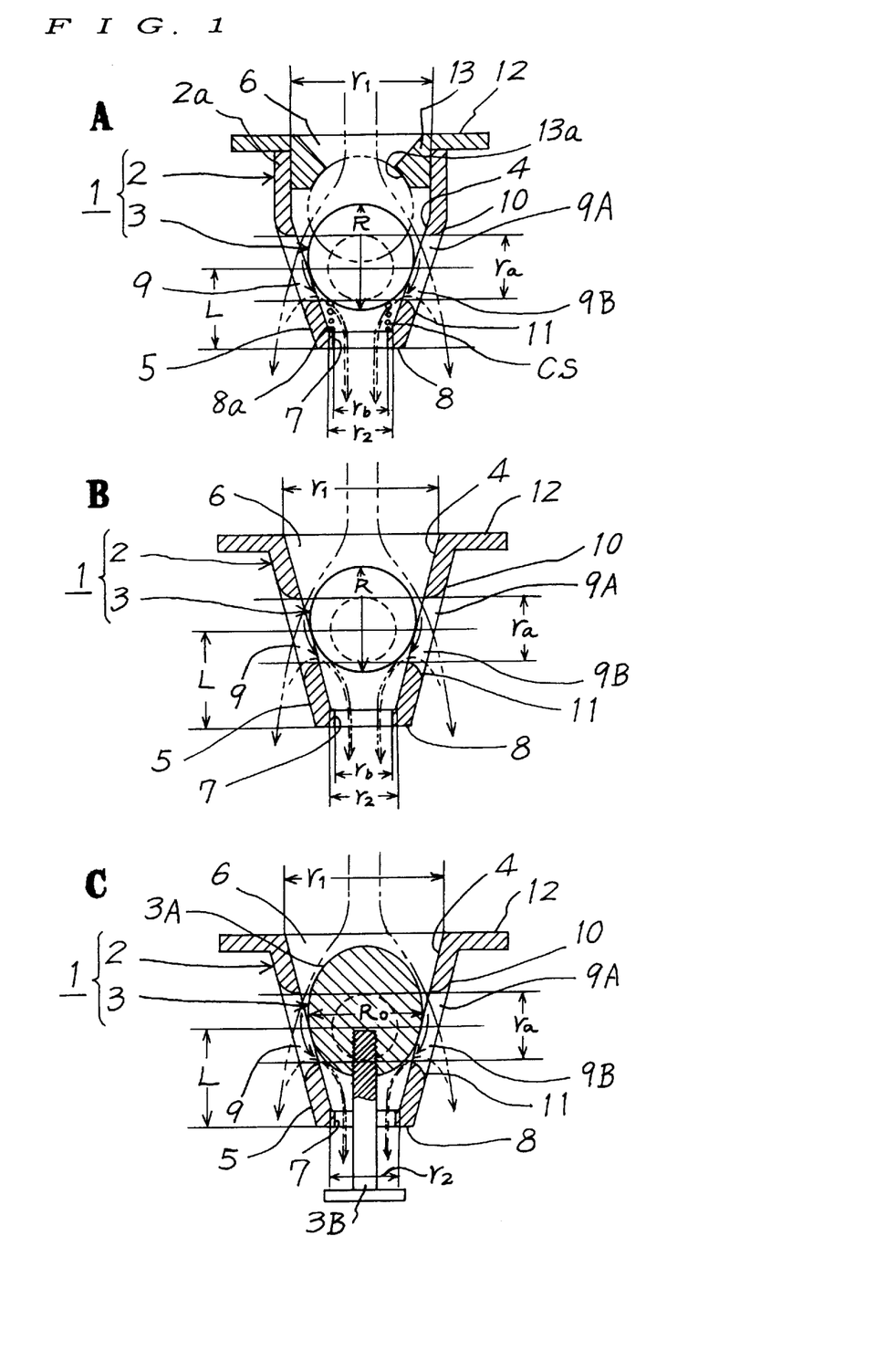
FIG. 1 shows concrete examples of the constant flowrate water saving valve according to this invention.

FIG. 1 shows concrete embodiments of the constant flowrate water saving valve according to the invention; FIG. 1A is a schematic side view, in section, showing a first embodiment thereof; FIG. 1B is a schematic side view, in section, showing a second embodiment thereof; and FIG. 1C is a schematic side view, in section, showing a third embodiment thereof.

To start with, the basic arrangement of a constant flowrate water saving valve according to the invention will be described with reference to FIGS. 1A, 1B and 1C. A constant flowrate water saving valve 1 according to this invention is constituted basically by a combination of a main valve body 2 and a movable valve member 3 disposed in said main valve body 2. The main valve body 2 is in the form of a cylindrical body which has a peripheral wall 5 forming a conical-shaped valve seat surface 4 with an inner diameter changing from $r_1$ to $r_2$ ($r_1 > r_2$) in the direction of flow of the fluid and which has a fluid inlet opening 6 on the side associated with said inner diameter $r_1$ and a reference end surface 8 having a ventilation opening 7 of diameter $r_b$ on the side associated with said inner diameter $r_2$.

The main valve body 2 has a plurality of fluid radial outflow openings 9 of diameterr formed in the peripheral wall 5 with the center of the openings located at an axial distance L from said reference end surface 8, said openings extending across the axis at predetermined angular intervals for example of 90°. The plurality of fluid radial outflow openings 9 formed in said peripheral wall 5 are chamfered as at 10 and 11 along their upper and lower edges, respectively.

The main valve body 2 is provided at its peripheral wall 5 with a radially outwardly extending attaching flange 12 at the end associated with said fluid inlet opening 6.

On the other hand, said movable valve member 3, according to the first embodiment shown in FIGS. 1A and 1B, is in the form of a perfect sphere of outer diameter R axially movably received in said main valve body 2. The outer diameter R of said movable valve member 3 in the form of a sphere is smaller than the inner diameter $r_1$ of the main valve body 2 but greater than the inner diameter $r_2$ of the main valve body 2. Further, the outer diameter R of said movable valve member 3 in the form of said sphere is pre-designed to be greater than the inner diameter $r_a$ of the fluid radial outflow openings 9 in the main valve body 2.

In contrast thereto, the movable valve member 3 according to the third embodiment shown in FIG. 1C is in the form of a modified sphere 3A provided with a guide member 3B and having an outer diameter $R_0$ extending along an axis directed by said guide member 3B and orthogonal to the central axis. The outer diameter $R_0$ of the modified sphere 3A is pre-designed to be smaller than the inner diameter $r_1$ of the main valve body 2 but greater than the inner diameter $r_2$ of the main valve body 2. The shape of said modified sphere 3A is not limited to the one shown in FIG. 1C.

Of the constant flowrate water saving valves according to the invention, the one in the first embodiment shown in FIG. 1A is provided with an upper stop member 13 on the side associated with the fluid inlet opening in said main valve body 2 for limiting the axial movement of the movable valve member 3. After receiving the movable valve member 3 in the main valve body 2, the upper stop member 13 is fixed to one axial end side 2a of said main valve body 2, thereby defining the fluid inlet opening 6. On the other hand, a coil spring member CS is incorporated in said main valve body 2 for pressing said movable valve member 3 toward said upper stop member 13.

The coil spring member CS is urged in the direction to press said movable valve member 3 against the valve seat surface 13a of the upper stop member 13, so that it is displaced in proportion to the magnitude of the fluid pressure which is external force and is pushed up to a position shown in phantom line in FIG. 1A when the fluid pressure disappears. The upper stop member 13 limits the axial movement of the movable valve member 3 received in the main valve body 2 and when an opposite fluid pressure acts on the constant flowrate water saving valve 1, the movable valve member 3 abuts against the valve seat surface 13a of the upper stop member 13 to completely close the fluid inlet opening 6, thereby preventing backward flow of the fluid.

The greatest feature of the construction of the constant flowrate water saving valves according to the invention is that the constructional elements of the inner diameters $r_1$ and $r_2$ which determine the angle of inclination of the conical-shaped valve seat surface 4 in said main valve body 2, the outer diameters R and $R_0$ of said movable valve member 3, the inner diameter $r_a$ of the plurality of fluid radial outflow openings 9 formed in said peripheral wall 5, the diameter $r_b$ of the ventilation opening 7, and the axial distance L from the reference end surface 8 to the center of the fluid radial outflow openings 9, are selectively designed.

In one embodiment shown in FIG. 1B, a preferred example of dimensioning is given: the inner diameter $r_1 = 9.5$ mm, the inner diameter $r_2 = 4.0$ mm, the outer diameter R of said movable valve member 3 is 7.0 mm, the inner diameter $r_a$ of the plurality of fluid radial outflow openings 9 formed in said peripheral wall 5 is 4.0 mm, the diameter $r_b$ of the ventilation opening 7 is 3.5 mm, and the axial distance L from the reference end surface 8 to the center of the fluid radial outflow openings 9 is 6.7 mm.

That is, by establishing the aforesaid dimensioning relation among the inner diameters $r_1$ and $r_2$ which determine the angle of inclination of the conical-shaped valve seat surface 4 in said main valve body 2, the outer diameter R of said movable valve member 3, the inner diameter $r_a$ of the fluid radial outflow openings 9, in this invention it can be arranged that when said movable valve member 3 comes into perfect valve seat abutment against said conical-shaped valve seat surface 4 within the main valve body 2, the fluid inlet opening 6 in said main valve body 2 communicates with the outside through the upper edge-side opening portions 9A of said plurality of fluid radial outflow openings 9 and the ventilation opening 7 in said main valve body 2 communicates with the outside through the lower edge-side opening portions 9B of said plurality of fluid radial outflow openings 9.

Figure 2:
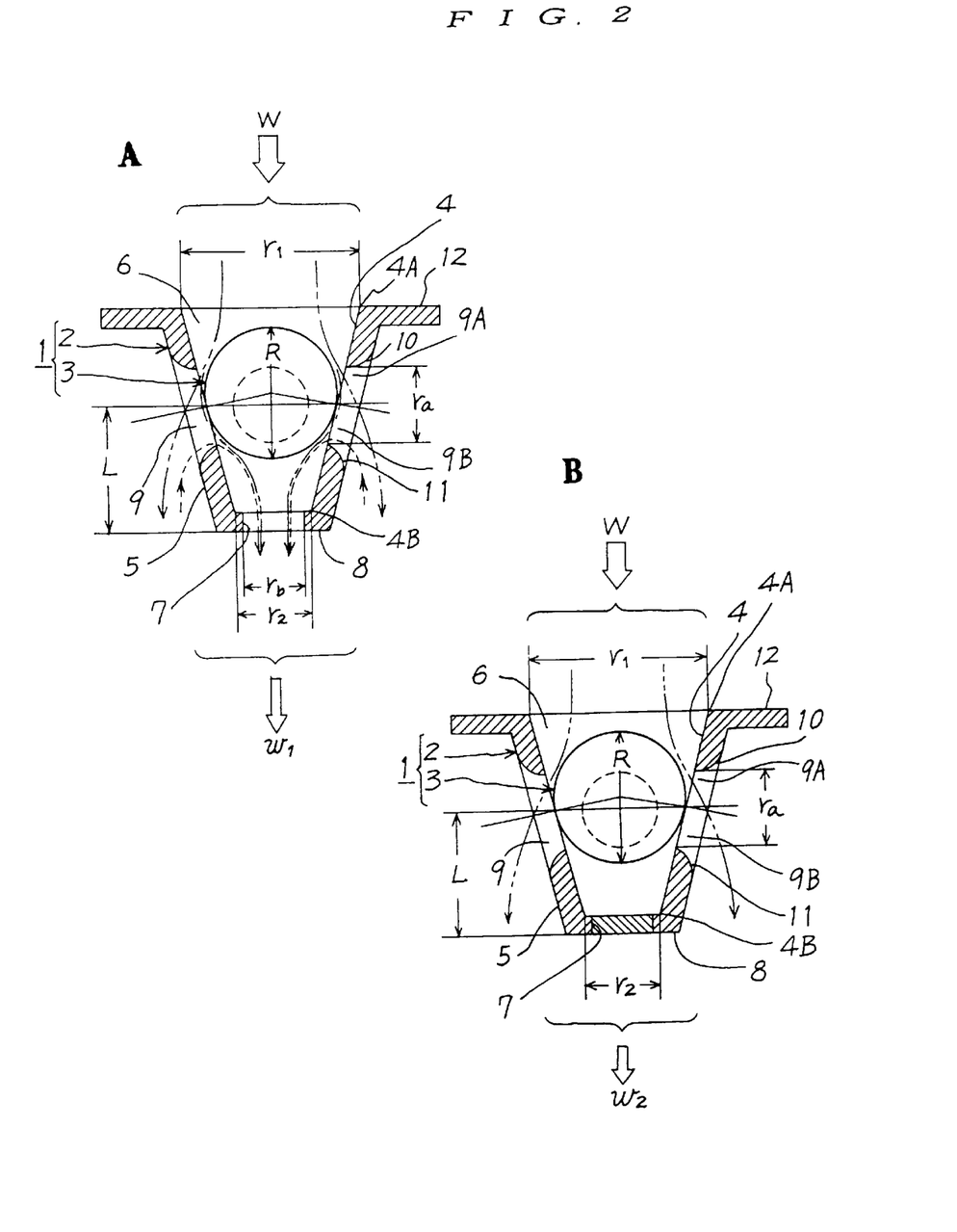
FIG. 2 is used for explaining experimental data on a constant flowrate water saving valve according to the second embodiment shown in FIG. 1B.

The principle of the constant flowrate water saving valve 1 of this invention will now be described with reference to FIGS. 2A and 2B on the basis of experimental data. The constant flowrate water saving valve 1 shown in FIGS. 2A and 2B has been designed by incorporating the example of dimensioning given above, and the following test was conducted using this constant flowrate water saving valve 1. As for the test conditions, said constant flowrate water saving valve 1 was placed in a pipe having a stop water pressure of 2.5 Kg/cm$^2$, a maximum delivery rate of 28 liter/min, and an inner diameter of 13 mm, and numerical measurements were taken at a position 30 cm downstream of the delivery port for comparison between a first state in which the ventilation opening 7 in the main valve body 2 is opened as shown in FIG. 2A and a second state in which the ventilation opening 7 in the main valve body 2 is closed as shown in FIG. 2B. When the source cock was controlled to set the delivery rate at 6 liter/min, the former state provided 100 g, whereas the latter state provided 70 g. Similarly, when the source cock was controlled to set the delivery rate at 5 liter/min, the former state provided 70 g, whereas the latter state provided 50 g. Further, when the source cock was controlled to set the delivery rate at 4 liter/min, the former state provided 50 g, whereas the latter state provided 35 g.

As a result, it has been confirmed that in the state in which the ventilation opening 7 in the main valve body 2 is opened as shown in FIG. 2A, the external air is sucked in through the plurality of fluid radial outflow openings 9 and flows along the channel shown in dotted line in FIG. 2A to be mixed with the water, in which mixed state it is discharged into the outside through the ventilation opening 7. That is, it has been confirmed that in this case, the mixing of the external air increases the amount of the discharged fluid by about 30%, whereby energy-increased shower water is obtained. The test results described above are supported by the phenomenon called aeration.

As for the concrete arrangement of a shower head using the constant flowrate water saving valve 1 of the above arrangement in this invention, hand type shower head 21 shown in FIGS. 3 and 4 and a fixed type shower head 41 shown in FIG. 5 will now be described in detail.

Figure 3:
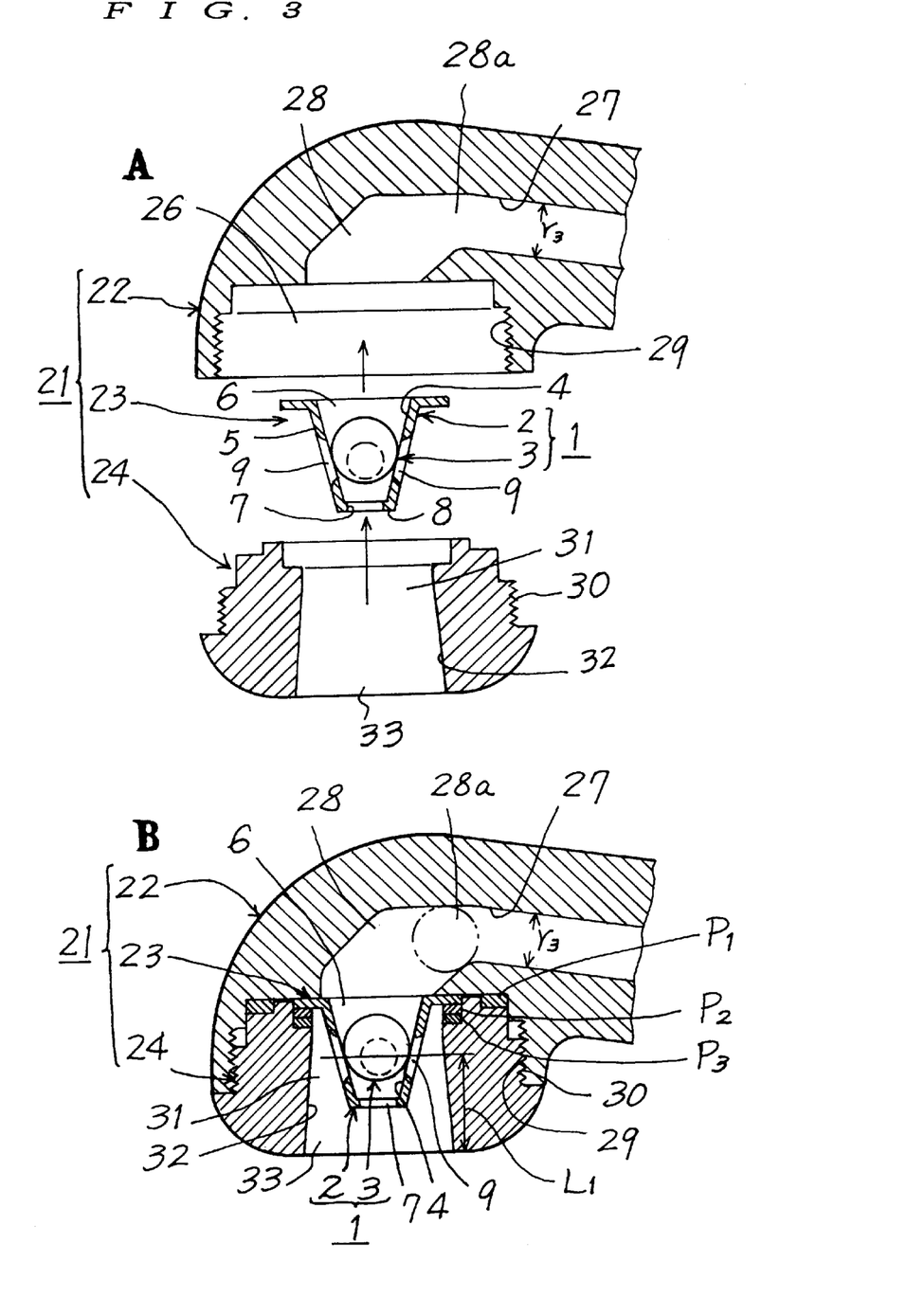
FIG. 3 shows a concrete example of construction of a hand type shower head having a constant flowrate water saving valve of the invention housed therein.
Figure 4:
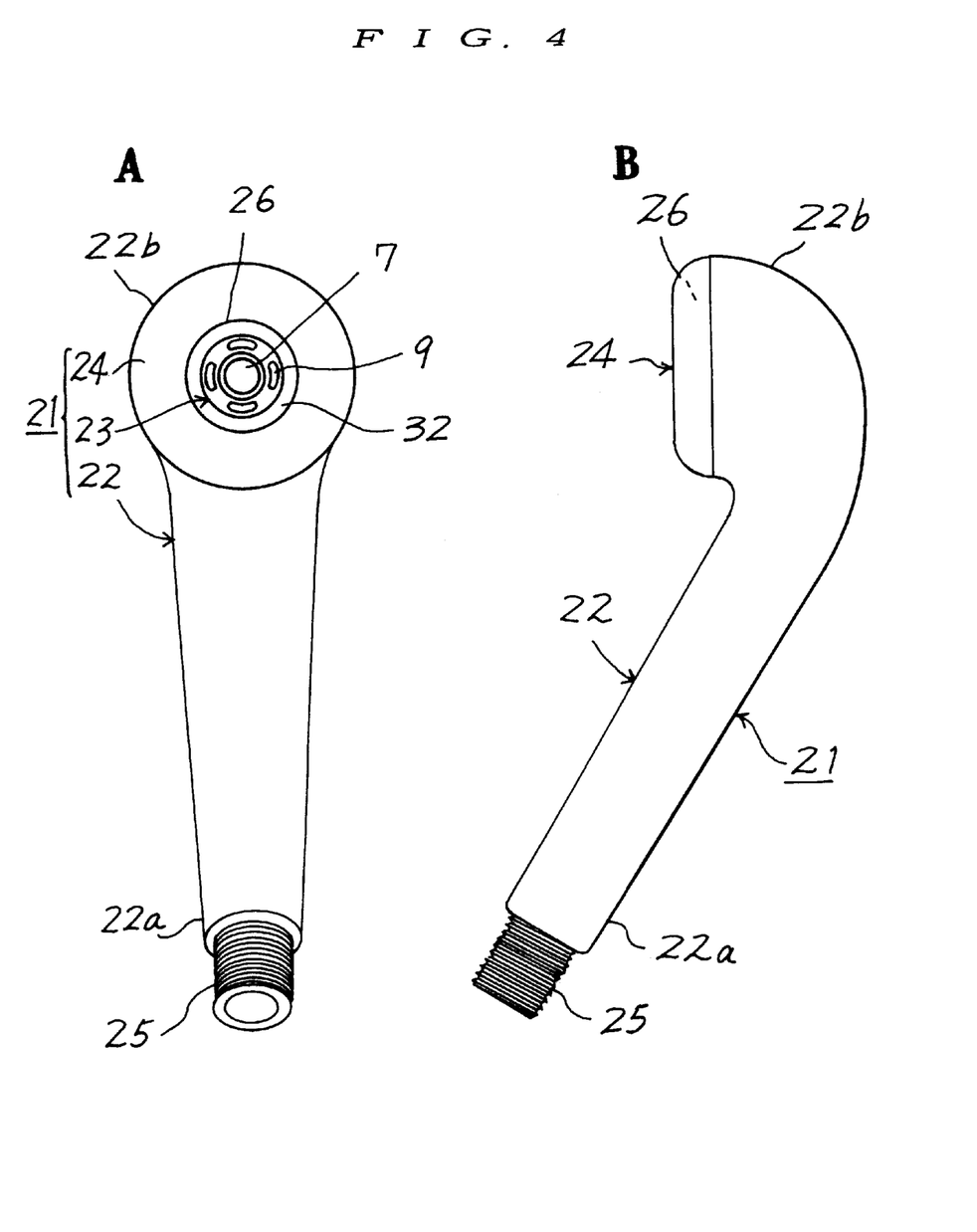
FIG. 4 is shows a concrete example of the external appearance of a hand type shower head having a constant flowrate water saving valve housed therein.

The hand type shower head shown in FIGS. 3 and 4 is basically a combination of a shower head main body 22, a flow rate controller 23 in the form of the constant flowrate water saving valve 1 received in said shower head main body 22, and a shower head discharge port attachment 24.

The shower head main body 22 is provided at one end side 22a with a channel hose member connector 25 and is connected to a fluid channel through said channel hose member connector 25. The other end side 22b of said shower head main body 22 is provided with a constant flowrate water saving valve installing portion 26 for installing said constant flowrate water saving valve 1. The shower head main body 22 has a channel 27 for channel-connecting said channel hose member connector 25 and said constant flowrate water saving valve installing portion 26. The side of said channel 27 associated with the constant flowrate water saving valve installing portion 26 is formed with a movable valve member entrance chamber 28 which said movable valve member 3 enters, whereas the real inner diameter $r_3$ of the channel 27 is designed to be smaller than the outer diameter R of the movable valve member 3 so as to be able to block the entrance of the movable valve member 3.

The side of the shower head main body 22 associated with the constant flowratewater saving valve installing portion 26 is provided with a threaded portion 29 for threadedly connecting said shower head discharge port attachment 24.

On the other hand, in the hand type shower head 21 using the constant flowrate water saving valve according to the invention, the flow rate controller 23 which is one of the structural requisites is constructed by the aforesaid constant flowrate water saving valve 1. A description of the detailed arrangement of this flow rate controller 23 is omitted by substituting the description given above of the constant flowrate water saving valve 1. In addition, in the concrete embodiment shown in FIGS. 3A and 3B, it is not necessary for the flow rate controller 23 to have a coil spring member CS housed therein. The hand type shower head 21 has at least two-axis directionality in its manner of use, and there is a stop portion 28a for the movable valve member 3 in the direction Y which crosses the axis X of the constant flowrate water saving valve 1, so that when said movable valve member 3 assumes a position shown in phantom line, the fluid radial outflow openings 9 and ventilation opening 7 are opened, and dust, rust and the like can be removed from the fluid radial outflow openings 9 and ventilation opening 7 when the fluid is discharged.

In addition, in the concrete embodiment shown in FIGS. 3A and 3B, said flow rate controller 23 is shown by way of example in combination with the constant flowrate water saving valve 1 shown in FIG. 1B. Alternatively, it may be in combination with the constant flowrate water saving valve 1 shown in FIGS. 1A and 1C.

In the hand type shower head 21 using said constant flowrate water saving valve, said shower head discharge port attachment 24 serves to fix said flow rate controller 23 in the channel of the fluid discharge terminal in the shower head main body 22 and comprises means by which the fluid discharged from the fluid radial outflow openings 9 in the constant flowrate water saving valve 1 functioning as said flow rate controller 23 is restricted to the direction of the outflow axis. In the figures, the reference characters $P_1$, $P_2$, $P_3$ denote packings.

The shower head discharge port attachment 24 is in the form of a cylindrical body comprising, at one axial end, a connector 30 adapted to be threadedly connected to a threaded portion 29 provided at the fluid discharge terminal of said shower head main body 22, and a valve receiving portion 31 for receiving said constant flowrate water saving valve 1, and, at the other axial end, a peripheral wall surface 32 by which the fluid discharged from the fluid radial outflow openings 9 in the constant flowrate water saving valve L is restricted to the direction of the outflow axis.

In the hand type shower head 21 using said constant flowrate water saving valve, if said shower head discharge port attachment 24 is designed to have a suitable axial dimension, the distance $L_1$ can be changed; if the distance $L_1$ is increased, the radiating angle of the discharge fluid is reduced, enabling the fluid, at a constant flow rate, to act more strongly on the human body in a spotted pattern. If the distance L is reduced, the radiating angle of the discharge fluid is increased, enabling the fluid, at a constant flow rate, to act on the human body in a dispersed pattern.

Figure 5:
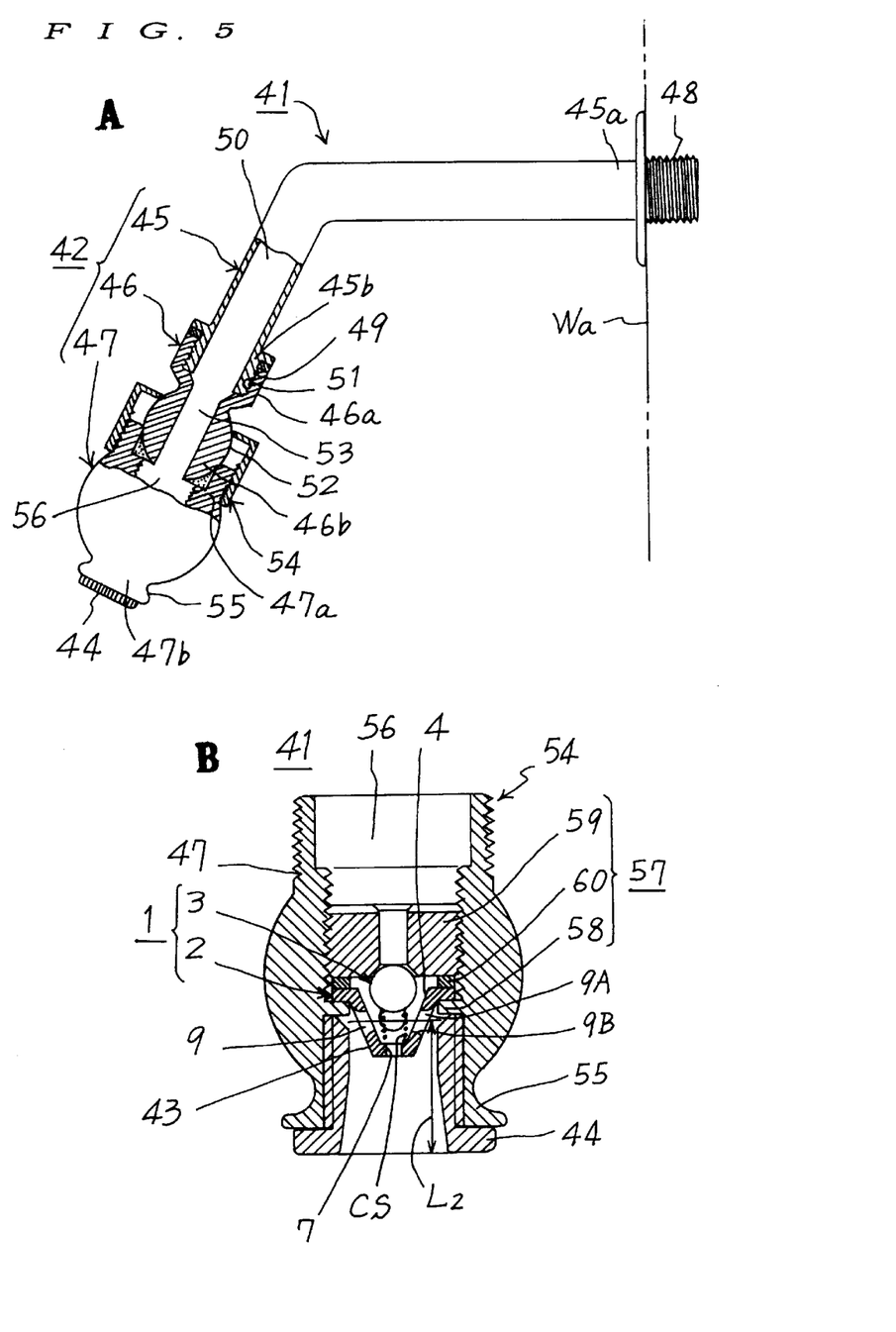
FIG. 5 shows a concrete example of the external appearance of a fixed type shower head having a constant flowrate water saving valve housed therein.

On the other hand, the fixed type shower head 41 shown in FIG. 5 is basically a combination of a shower head main body 42, a flow rate controller 43 constituted by the constant flowrate water saving valve 1, and a shower head discharge port attachment 44.

The shower head main body 42 comprises a channel pipe member 45, an intermediate connecting member 46, and a shower head member 47. The channel pipe member 45 is provided at one end side 45a with a wall surface connecting threaded portion 48 adapted to be attached directly to the wall surface Wa and at the other end side 45b with a threaded portion 49 for threadedly fixing said intermediate connecting member 46. The channel pipe member 45 forms a fluid channel 50 extending axially therethrough.

The intermediate connecting member 46 is provided at one end side 46a with an internal threaded portion 51 adapted to be threadedly connected to the threaded portion 49 of the channel pipe member 45 and at the other end side 46b with a universal joint head 52 having a spherical surface. The intermediate connecting member 46 forms fluid channel 53 axially extending therethrough.

The shower head member 47 is provided at one end side 47a with a universal joint connecting means 54 which is universal-connected to the universal joint head 52 in said intermediate connecting member 46 and at the other end side 47b with an attachment securing portion 55 for threadedly connecting said shower head discharge port attachment 44. The shower head member 47 forms a fluid channel 56 axially extending therethrough.

The shower head member 47 has constant flowrate water saving valve installing means 57 disposed in an axially extending intermediate region of the fluid channel 56 for installing said constant flowrate water saving valve 1. The constant flowrate water saving valve installing means 57 is composed of a flange 58, a constant flowrate water saving valve fixing screw member 59, a packing 60, etc. In the case of this embodiment, said constant flowrate water saving valve fixing screw member 59 corresponds to the upper stop member 13 in the constant flowrate water saving valve 1 shown in FIG. 1A and functions as an upper stop for the movable valve member 3 of the constant flowrate water saving valve 1.

On the other hand, in the fixed type shower head 41 using the constant flowrate water saving valve according to the invention, the flow rate controller 43 which is one of the structural requisites thereof is constituted by the constant flowrate water saving valve 1 described above. A description of the detailed arrangement of the flow rate controller 43 is omitted by substituting the description given above of the constant flowrate water saving valve 1. In addition, in the concrete embodiment shown in FIG. 5B, said flow rate controller 43 preferably has a coil spring member CS housed therein. Since the fixed type shower head 41 is always held downward, the movable valve member 3 is urged upward by the coil spring CS, whereby dust and the like can be removed from the fluid radial outflow openings 9 and the ventilation opening 7 when the fluid is discharged.

In the fixed type shower head 41 using the constant flowrate water saving valve, the shower head discharge port attachment 44 is substantially in the form of a cylindrical body threadedly connected to said shower head member 47 and adapted to make a telescopic movement when turned. If the distance $L_2$ is increased by turning the shower head discharge port attachment 44, the radiating angle of the discharge fluid is reduced, enabling the fluid, at a constant flow rate, to act more strongly on the human body in a spotted pattern. If the distance $L_2$ is reduced, the radiating angle of the discharge fluid is increased, enabling the fluid, at a constant flow rate, to act on the human body in a dispersed pattern.

INDUSTRIAL APPLICABILITY

According to the shower head 21 using the constant flowrate water saving valve of this invention arranged as described above, the fluid discharged from the fluid discharge port 33 of said shower head discharge port attachment 24 is as follows. The user connects said shower head 21 to the fluid channel including a flow rate adjusting cock through the channel hose member or the like and opens the flow rate adjusting cock. When the fluid reaches the flow rate controller 23, the constant flowrate water saving valve 1 of the invention forming the flow rate controller 23 is activated, controlling the amount of discharge of fluid reaching the fluid inlet opening 6 of said constant flowrate water saving valve 1 so as to save water.

In this case, since the constant flowrate water saving valve 1 is composed of a combination of the main valve body 2 and the movable valve member 3 received in the main valve body 2, even if the fluid radial outflow openings 9 in the main valve body 2 are made relatively large (to the extent which makes choking less liable to occur), it is possible to throttle the fluid radial outflow openings 9 by the movable valve member 3 to reduce the substantial hole diameter, thereby saving water and increasing the flow rate.

That is, when the constant flowrate water saving valve 1 of this invention is used by being set in a channel, the movable valve member 3, when subjected to a fluid pressure, comes into perfect valve seat abutment against the conical-shaped valve seat surface 4 within the main valve body 2, thereby throttling the fluid radial outflow openings 9, controlling the amount of discharge of the fluid which reaches the fluid inlet opening 6 in the constant flowrate water saving valve 1, so as to save water.

On the other hand, when the movable valve member 3 comes into perfect valve seat abutment against the conical-shaped valve seat surface 4 within the main valve body 2, the side of the main valve body 2 associated with the fluid inlet opening 6 communicates with the outside through the upper edge-side opening portions 9A of the plurality of fluid radial outflow openings 9, while the side of the main valve body 2 associated with the ventilation opening 7 communicates with the outside through the lower edge-side opening portions 9B of the plurality of fluid radial outflow openings 9. In this case also, the fluid brought to the side of the main valve body 2 associated with the fluid inlet opening 6 is radially discharged into the outside through the upper edge-side opening portions 9A of the plurality of fluid radial outflow openings 9, while the external air is sucked in through the lower edge-side opening portions 9B of the plurality of fluid radial outflow openings 9 and mixed with water along the channel shown in dotted line in FIG. 2A, in which mixed state it is discharged into the outside through the ventilation opening 7; thus, discharge fluid effectively containing external air can be obtained, and hence the massaging effect and clearing effect during shower can be enhanced.

I claim:

1. A constant flowrate water saving valve comprising:
    a main valve body in the form of a cylindrical body having a peripheral wall, a first inner diameter portion of inner diameter $r_1$ on one axial end side, a second inner diameter portion of inner diameter $r_2$ on the other axial end side ($r_1 > r_2$), a conical-shaped valve seat surface connecting said first and second inner diameter portions (4A, 4B), a liquid inlet opening on the side associated with said first inner diameter portion, a ventilation opening of diameter $r_b$ on the bottom wall of the side associated with said second inner diameter portion, and a plurality of liquid radial outflow openings of diameter ra extending through the peripheral wall to cross the main valve body axis, and
    a movable valve member axially movably received in said main valve body, wherein
    when said movable valve member comes into perfect valve seat abutment against said conical-shaped valve seat surface, the liquid inlet opening in said main valve body communicates with the outside through the upper edge-side opening portions of said plurality of liquid radial outflow openings and the ventilation opening in said main valve body communicates with the outside through the lower edge-side opening portions of said plurality of liquid radial outflow openings, and the external air is sucked in through said plurality of liquid radial outflow openings and to be mixed with the water, in which mixed state it is discharged into the outside through said ventilation opening.

2. A constant flowrate water saving valve as set forth in claim 1, wherein said movable valve member is in the form of a sphere of outer diameter R ($r_1 > R > r_2$, $R > r_a$).

3. A constant flowrate water saving valve as set forth in claim 1, characterized in that said movable valve member is in the form of a modified sphere provided with a guide member and having a diameter $R_0$ ($r_1 > R_0 > r_2$) extending along an axis which is directed by said guide member and orthogonal to the central axis.

4. A shower head using a constant flowrate water saving valve comprising:
    a shower head main body having a valve receiving portion,
    a constant flowrate water saving valve attached to the valve receiving portion of said shower head main body and having at least one liquid radial outflow opening, and a shower head discharge port attachment having a peripheral wall by which the liquid discharged from the liquid radial outflow opening in said constant flowrate water saving valve is limited to the direction of the outflow axis, said constant flowrate water saving valve comprising a main valve body in the form of a cylindrical body having a peripheral wall, a first inner diameter portion of inner diameter $r_1$ on one axial end side, a second inner diameter portion of inner diameter $r_2$ on other axial end side ($r_1 > r_2$), a conical-shaped valve seat surface connecting said first and second inner diameter portions, a liquid inlet opening on the side associated with said first inner diameter portion, a ventilation opening of diameter rb on the bottom wall of the side associated with said second inner diameter portion, and a plurality of liquid radial outflow openings of diameter $r_a$ extending through the peripheral wall to cross the main valve body axis, and a movable valve member axially movably received in said main valve body, said constant flowrate water saving valve being arranged such that when said movable valve member comes into perfect valve seat abutment against said conical-shaped valve seat surface, the side of said main valve body associated with the liquid inlet opening communicates with the outside through the upper edge-side opening portions of said plurality of liquid radial outflow openings and the side of said main valve body associated with the ventilation opening communicates with the outside through the lower edge-side opening portions of said plurality of liquid radial outflow openings, and the external air is sucked in through said plurality of liquid radial outflow openings and to be mixed with the water, in which mixed state it is discharged into the outside through said ventilation opening.

* * * * *